(12) United States Patent
Lam

(10) Patent No.: US 8,317,624 B1
(45) Date of Patent: Nov. 27, 2012

(54) SYSTEM AND METHOD FOR CREATING AND/OR SERVING ONLINE GAMES EMBEDDED IN WEBSITES

(75) Inventor: Mo Lam, New York, NY (US)

(73) Assignee: TwoChop Inc., New York, NY (US)

( * ) Notice: Subject to any disclaimer, the term of this patent is extended or adjusted under 35 U.S.C. 154(b) by 0 days.

(21) Appl. No.: 13/290,744

(22) Filed: Nov. 7, 2011

(51) Int. Cl.
*G06T 15/00* (2006.01)

(52) U.S. Cl. .......................................... 463/42; 715/720

(58) Field of Classification Search .............. 463/40–42; 715/720
See application file for complete search history.

(56) References Cited

U.S. PATENT DOCUMENTS

| | | | |
|---|---|---|---|
| 8,025,572 B2 * | 9/2011 | Spanton et al. ................. | 463/42 |
| 2007/0117635 A1 * | 5/2007 | Spanton et al. ................. | 463/43 |
| 2008/0125226 A1 * | 5/2008 | Emmerson ....................... | 463/42 |
| 2009/0210304 A1 * | 8/2009 | Loveman ......................... | 705/14 |
| 2009/0249244 A1 * | 10/2009 | Robinson et al. .............. | 715/781 |
| 2011/0107220 A1 * | 5/2011 | Perlman .......................... | 715/720 |

* cited by examiner

*Primary Examiner* — Masud Ahmed
(74) *Attorney, Agent, or Firm* — Pillsbury Winthrop Shaw Pittman

(57) ABSTRACT

Online games embedded in webpages of websites may be created and/or served through a system and/or method. The games may be embedded in websites that are hosted separately from the games. The games may be designed by the website operators and/or other entities associated with the websites, and may include content from the websites to drive engagement with the websites and their content. An interface may be provided to the website operators to facilitate efficient and intuitive configuration of games that use website content. Such games may be served separately from the websites. As such, the games may provide a convenient, efficient, and/or effective mechanism for enhancing engagement of users with the website and/or its content.

21 Claims, 4 Drawing Sheets

SYSTEM AND METHOD FOR CREATING AND/OR SERVING ONLINE GAMES EMBEDDED IN WEBSITES

FIELD

The disclosure relates to a system and method of creating and/or serving online games embedded in webpages of websites, where the games include or relate to content from the websites, but are served by one or more game servers that are separate and discrete from the web servers serving the webpages of the websites.

BACKGROUND

Websites generally include one or more webpages that may present content to users. Some websites provide for interactivity by users. However, providing such functionality to websites may require some level of expertise in preparing software code and/or expertise in how to incorporate content from the website into interactive activities. As such, the barrier for entry for providing such functionality may dissuade some website providers from including interactive activities that may drive user engagement.

SUMMARY

One aspect of the disclosure relates to a system and method of creating and/or serving online games embedded in webpages of websites. The games may be embedded in websites that are hosted separately from the games. The games may be designed by the website operators and/or other entities associated with the websites, and may include or relate to content from the websites to drive user engagement with the websites and their content. An interface may be provided to the website operators to facilitate efficient and intuitive configuration of games that use or reference website content. Such games may be served separately from the websites. As such, the games may provide a convenient, efficient, and/or effective mechanism for enhancing engagement of users with the website and/or its content.

The system may include one or more game servers configured to communicate with client computing platforms of users and/or one or more web servers configured to host websites. The game server may be configured to execute one or more of a game selection module, a content selection module, a game information module, a game indicator module, a game module, a reward module, and/or other modules.

The game selection module may be configured to receive a selection by a creating user creating a game using a game template. Game templates may be categorized by the content that they could turn into games. The game template may specify a game mechanic for the game. The game selection module may be configured to generate a user interface for presentation to the creating user. The user interface may be configured to receive entry and/or selection of the game template. The creating user interface may be presented to the user via a client computing platform associated with the creating user.

The content selection module may be configured to receive selections made by the creating user of content from the website. The content from the website may include content presented to users of the website on the webpages of the website. The received selections may include electronic files containing the selected content, reference locations (e.g., network locations, file system addresses, and/or other reference locations), and/or may identify or provide the selected content in other ways. The content selection module may be configured to generate a user interface for presentation to the creating user.

The game information module may be configured to receive information from the creating user that defines one or more aspects of the game. Such information may include, art assets to customize the visuals of the game, music tracks and other sound effects to customize the audio of the game, questions to be posed to users as part of a game, a performance threshold for the game by which user performance in the game may be measured, an amount of time allotted to one or more tasks in the game, a number of tasks to be included in the game, metadata related to content received by the content selection module for the game, a game parameter, and/or other information.

The game indicator module may be configured to provide a game indication object that is embedded in a webpage of the website. The game indication object may indicate to users viewing the webpage that the game is available, the game that is associated with the game indication object, times the game has been played, top scoring players of the game, and other game related information. The game indication object may be selectable by users of the webpage to initiate game play. Upon being selected, the game indication object may capture information from user client. Such information may include the webpage URL address and the meta-tag information of the webpage. The game indicator object may be served by the game server, and/or may be an object transmitted to the web server for the web server to serve in the webpage.

The game module may be configured receive selections of the game indication object by users through the webpage. Responsive to such selections, the game module may serve the game to the users. This may include, for a selection of the game indication object by a given user viewing the webpage, serving an instance of the game to the given user by generating view information for transmission to a client computing device associated with the given user. The view information may define a view of the instance of the game for presentation on the client computing device. The game (and hence the view of the game provided to the given user) includes content from the website selected by the creating user. The interaction of the given user with the selected content may enhance engagement of the given user with the website and/or the content included therein. The view may include suggestions of other websites and/or pages on the present website having similar games, games including or related to similar content, and/or other games likely to be of interest to the user.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
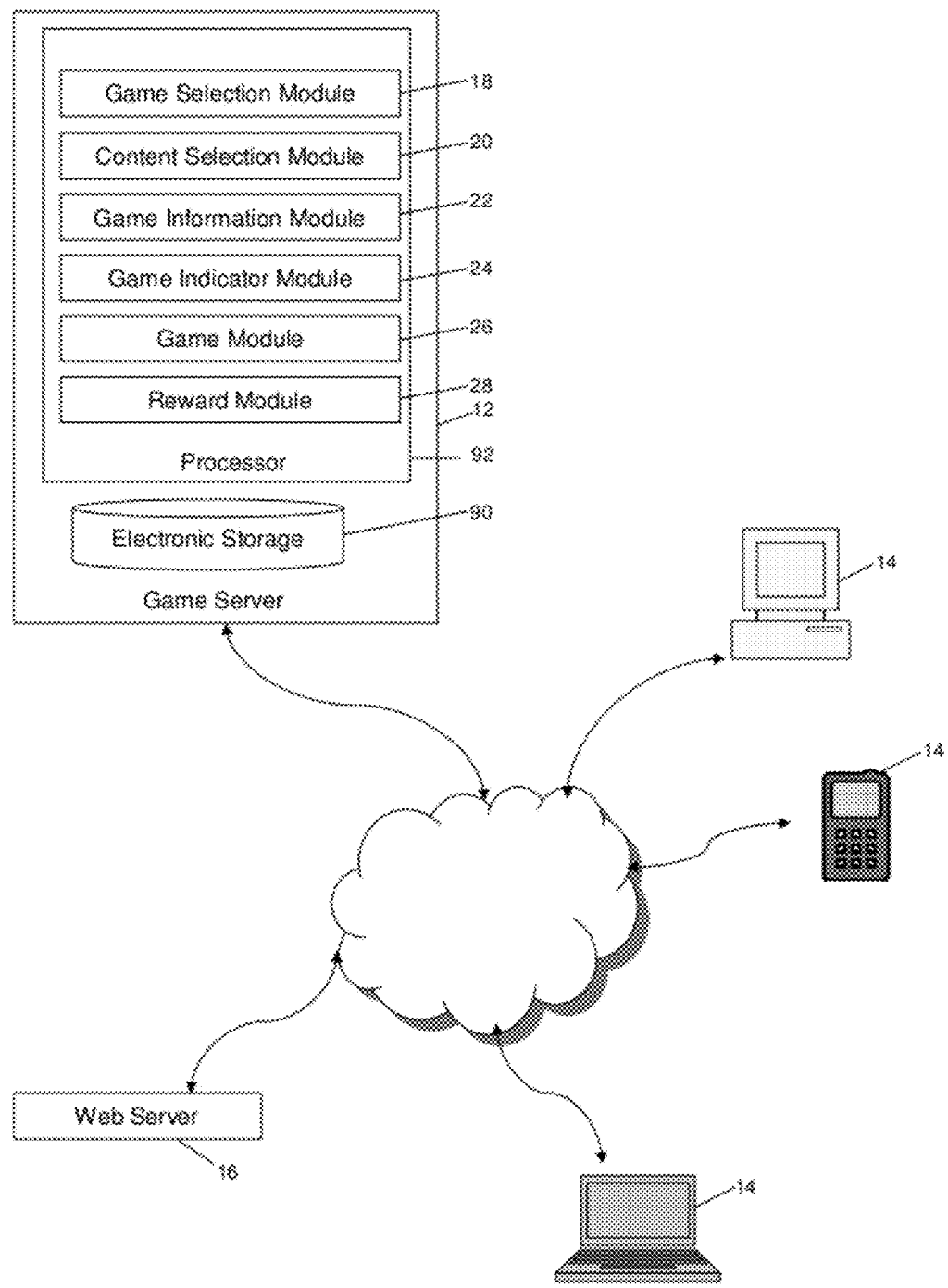
FIG. 1 illustrates a system configured to host online games.

FIG. 1 illustrates a system 10 configured to host online games. The games may be embedded in websites that are hosted separately from the games. The games may be designed by the website operators and/or other entities associated with the websites, and may include content from the websites to drive engagement with the websites and their content. System 10 may provide an interface to the website operators to facilitate efficient and intuitive configuration of games that use website content, and may host such games separately from the websites. As such, the games may provide a convenient, efficient, and/or effective mechanism for enhancing engagement of users with the website and/or its content. In some implementations, system 10 may include one or more game servers 12.

Game server 12 may be configured to communicate with client computing platforms 14 in a client/server configuration. Client computing platforms 14 may be configured to operate in a client/server configuration with one or more web servers 16. Web server 16 may be configured to serve or host webpages. The webpages may be organized into websites. The webpages may be associated with different network locations (e.g., URLs and/or other network locations). The network location associated with a given webpage may be the network location at which web server 16 serves the given webpage. Game server 12 and web server 16 may be configured to communicate with each other. The communication between game server 12, web server 16, and/or client computing platforms 14 may take place via wired and/or wireless communication media, and/or may take place through a network.

Game server 12 may be separate and discrete from web server 16. This may refer to hardware devices that are physically separate from each other, and/or computing resource that are divided virtually between game server 12 and web server 16. Game server 12 may be configured to serve games through webpages that are served by web server 16. In some implementations, game server 12 may be configured to execute one or more of a game selection module 18, a content selection module 20, a game information module 22, a game indicator module 24, a game module 26, a reward module 28, and/or other modules.

Game selection module 18 may be configured to receive a selection of a game template for a game being created. The game may be created by an operator of a website, and/or other parties or entities associated with the website. Game selection module 18 may be configured to generate a user interface for presentation to the creating user on a client computing platform 14 associated with the creating user. The user interface may include one or more fields configured to receive entry and/or selection of a game template for the game being created. The different game templates may correspond to games having different game mechanics. By way of non-limiting example, potential game templates may include one or more of a trivia game template, a word game template, an image analysis game template, an image puzzle game template, list game template, music game template, and/or other game templates.

Figure 2:
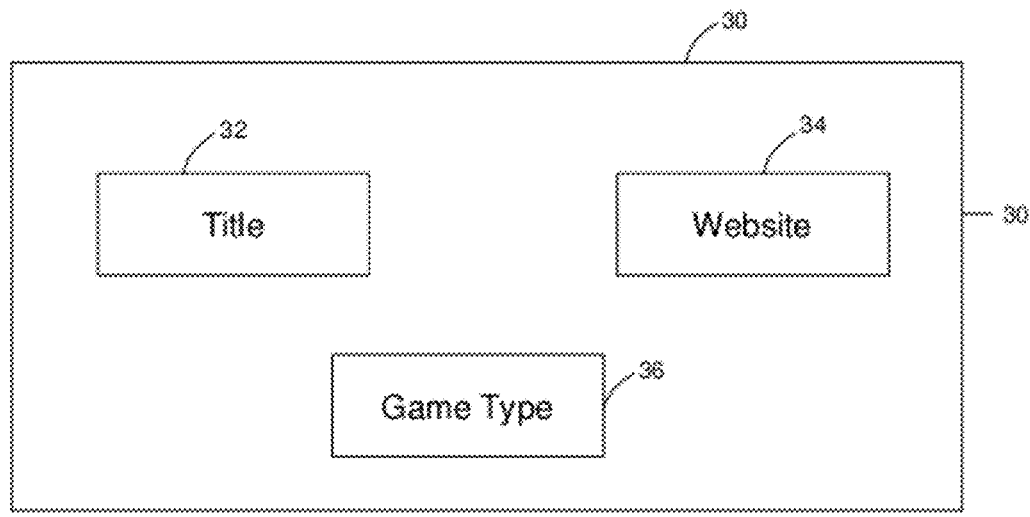
FIG. 2 illustrates a user interface.

By way of illustration, FIG. 2 depicts a user interface 30 that may be presented to a creating user to facilitate selection and/or entry of a game template for a game. User interface 30 may include one or more of a title field 32, a website field 34, a game template field 36, and/or other fields. Title field 32 may be configured to display a title of the game. Website field 34 may be configured to display a website and/or webpage with which the game will be associated (e.g., where it will be embedded, from which content for the game will be obtained, and/or associated with the game in other ways). Game template field 36 may be configured to receive entry and/or selection of a game template for the game being created. Entry may include manual entry of a game template, and/or other mechanisms for input entry. To facilitate selection of a game template, game template field 36 may be configured to present a set of potential game templates for selection by the creating user. The set of potential game templates may be presented in a list, a pop-up menu, a drop-down menu, and/or via other mechanisms for displaying selectable options.

Returning to FIG. 1, content selection module 20 may be configured to receive selections from creating users of content to be included in games. The content selected for a given game may be selected from a webpage in a website associated with the given game. Selected content may be received by content selection module 20 in the form of electronic files with the actual content, and/or may include network locations at which the content can be obtained from web server 16. To facilitate receipt of such content, content selection module 20 may be configured to generate a user interface for presentation to creating users through which content can be entered and/or selected for content selection module 20. The content may include one or more of images, video, audio, text, and/or other content. The selections of content received through content selection module 20 enable a creating user to efficiently and effectively create a game for users of a website that includes content from the website. The use of content from the website in the game being created may enhance user engagement with the website and/or the subject matter thereof. The content selected may depend on the game template previously selected, as different game mechanics may call for different types of content.

Figure 3:
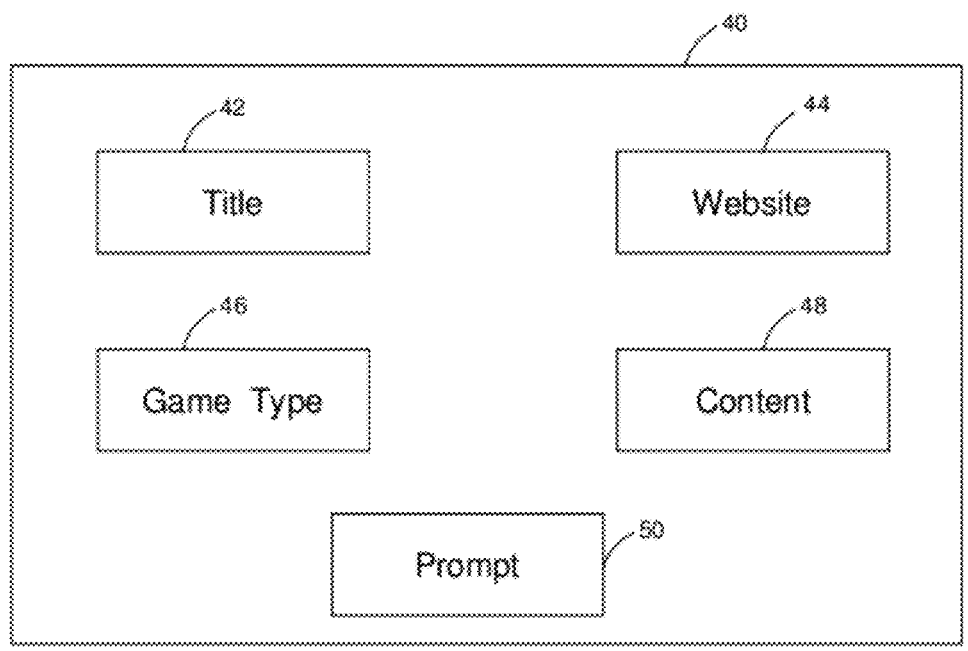
FIG. 3 illustrates a user interface.

By way of illustration, FIG. 3 depicts a user interface 40 that may be presented to a creating user to facilitate selection and/or entry of a game template for a game. User interface 40 may include one or more of a title field 42, a website field 44, a game template field 46, a content selection field 48, a prompt field 50, and/or other fields. Title field 42 may be configured to display a title of the game. Website field 44 may be configured to display a website and/or webpage with which the game will be associated (e.g., where it will be embedded, from which content for the game will be obtained, and/or associated with the game in other ways). Game template field 46 may present a game template for the game being created (e.g., as previously selected by the creating user). Content selection field 48 may be configured to receive selection and/or entry of content for inclusion in the game being created. The content may be content available on and/or included in the website where the game may be embedded. Entry may include manual entry of content and/or a network or file system location at which the content may be available, and/or other mechanisms for input entry. To facilitate selection of online content, content selection field 48 may be configured to facilitate browsing for the content. The browsing may be of a file system the website, and/or other content repositories. Content selection field 48 may include one or more of a list, a pop-up menu, a drop-down menu, and/or via other mechanisms for displaying selectable options.

Prompt field 50 may be configured to present information to the creating user about the content that should be selected.

This information may suggest one or more of a content type (e.g., image, video, text, and/or other types), a subject (e.g., logo, person or people, and/or other subjects), and/or other content parameters. The information presented to the creating user may be determined based on, for example, a game template selected for the game being created, metadata about content previously received from the creating user, previously configured game parameters, and/or other information previously obtained and/or determined about the game being created. The prompting information may be determined to facilitate creation of an engaging and/or integrated game.

Returning to FIG. 1, game information module 22 may be configured to receive information from creating users that define one or more aspects of the games being created. For example, game information module 22 may be configured to receive art assets to customize the visual of the game, music tracks and other sound effects to customize the audio of the game, one or more of questions to be posed to users as part of a game, a performance threshold for a game by which user performance in the game may be measured, an amount of time allotted to one or more tasks in a game, a number of tasks to be included in a game, metadata related to content received by content selection module 20 for a game, a game parameter, and/or other information.

Game indicator module 24 may be configured to provide game indication objects. The game indication object of a given game may be embedded in a webpage of a website associated with the given game. The game indication object may indicate the availability of the given game to users of the website, the game that is associated with the game indication object, times the game has been played, top scoring players of the game, and other game related information. The game indication object may be selectable by users of the website to initiate participation in the given game. To facilitate this functionality, the game indication object may include a network location associated with game server 12 at which game server 12 can be contacted to request participation in the given game. The network location may be the location at which game server 12 serves the given game. Responsive to selection of the game indication object by a user viewing the webpage (e.g., on a client computing platform 14), a request for the given game may be transmitted to game server 12 at the network location included in the game indication object. Game indicator module 24 may be configured such that providing the game indication objects may include serving a game indication object, transmitting a game indication object to web server 16 so that web server 16 serves the game indication object in a webpage directly, and/or providing game indication objects in other ways. A game indication object may include one or more of an image, an applet, a hyperlink, a flash object, and/or other objects.

Figure 4:
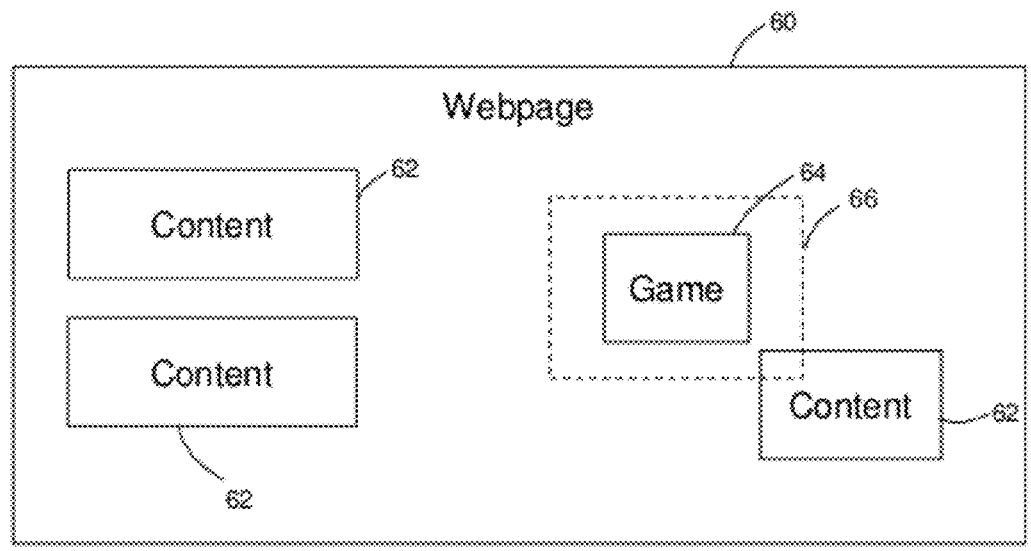
FIG. 4 illustrates a view of a webpage.

By way of illustration, FIG. 4 shows a view of a webpage 60 with a game embedded therein. Webpage 60 may include one or more of at least one content field 62, a game indication object 64, and/or other fields. Content fields 62 contain content presented to users of webpage 60. The organization of content into the discrete fields 62 illustrated in FIG. 4 is not intended to be limiting. In some implementations, content of webpage 60 may be spread throughout webpage 60 as, effectively, a single field. Game indication object 64 may be displayed in webpage 60 to indicate the availability of the game associated with game indication object 64. Game indication object 64 may appear outside of content fields 62, and/or may appear within (at least partially) one or more of content fields 62. Game indication object 64 may be visually static and/or dynamic within webpage 60. For example, responsive to a user wanding over game indication object 64, the appearance of game indication object 64 may be changed. In some implementations, while a cursor under control of the user is located over game indication object 64, game indication object 64 may expand to fill a field 66 illustrated in FIG. 4. The expanded game indication object may provide additional information like (not limited to) the game that is associated with the game indication object, times the game has been played, top scoring players of the game, and other game related information. This expansion may temporarily obscure content of webpage 60, and/or the expanded portion of game indication object 64 may facilitate view of webpage content through the expanded portion.

Referring back to FIG. 1, game module 26 may be configured to serve games to the users of the websites through webpages of the websites. Game module 26 may be configured to receive selections of the game indication objects, and to serve instances of the games to users responsive to the received selections. For example, responsive to a user selecting a game indication object in a webpage via a client computing platform 14, game module 26 may receive the selection, and may serve an instance of the game corresponding to the game indication object to the user via the client computing platform 14. This may include determining view information that describes a view of the instance of the game for presentation to the user via the client computing platform 14. The view of the instance of the game may include the content selected for the game by a creating user. Such content may include content from the website of the webpage. The use of such information may encourage the user to more fully explore the website, may inform the user about the subject(s) of the website, may engage the user with the content of the website, and/or may have other impacts on the user participating in the game.

Serving an instance of a game may include receiving control inputs from a user provided to game module 26 via a client computing platform 14 on which the user is viewing a view of the instance of the game. Game module 26 may be configured to implement these control inputs by performing corresponding actions in and/or with respect to the instance of the game. By submitting the control inputs, the user may be able to control one or more aspects of the game. Through this control, the user may participate in the game to complete a task or objective. The actions performed by game indicator module 24 in response to received control inputs may be reflected in the view of the instance of the game defined by the view information determined by game indicator module 24, thereby providing feedback to the user for the control being exerted.

Figure 5:
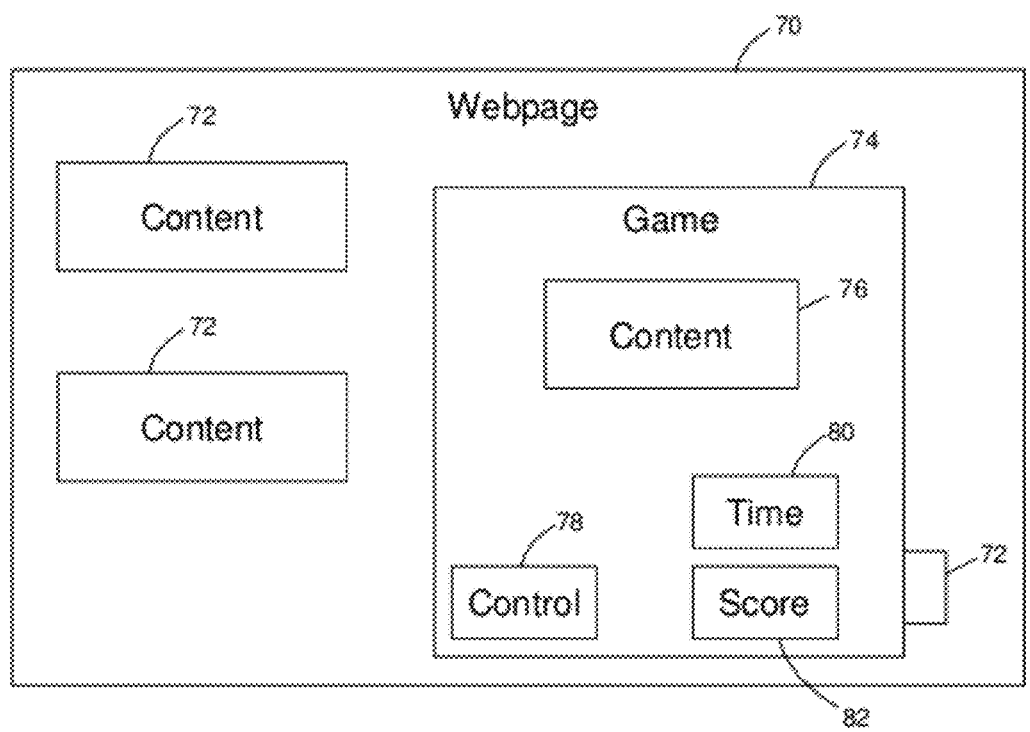
FIG. 5 illustrates a view of a webpage and a game.

By way of illustration, FIG. 5 depicts a view of a webpage 70 with a game embedded therein. The view illustrated in FIG. 5 may correspond to the view presented to a user via a browser window on a client computing platform. Webpage 70 may include one or more content field 72. Content fields 72 contain content presented to users of webpage 72. The organization of content into the discrete fields 72 illustrated in FIG. 5 is not intended to be limiting. In some implementations, content of webpage 70 may be spread throughout webpage 70 as, effectively, a single field.

A game interface 74 may presented inside of and/or along with webpage 70. Game interface 74 may be presented to the user within the same browser window as webpage 70, and/or game interface 74 may be presented within a separate interface window. Game interface 74 may be configured to present an instance of a game embedded within webpage 70 to the user. Game interface 74 may include one or more of a content field 76, a control field 78, a time field 80, a score field 82, and/or other fields. The view of the instance of the game may be presented within the browser window of the webpage in which the game indication object was located, and/or the view of the instance of the game may be presented within a separate interface window arranged inside of the browser window.

Content field 76 may be configured to present game content to the user. The game content may include content previously selected by a creating user from the website of webpage 70. The presentation of the game content to the user may be accompanied by one or more game elements associated with a game mechanic of game. The one or more game elements may, for example, explain how the user should interact with the content, be manipulated by the user with respect to the game content to participate in the game, present a question or challenge to be answered by the user as part of the game, and/or facilitate game play by the user in other ways.

Control field 78 may be configured to receive entry and/or selection of control inputs from the user. Although control field 78 is illustrated in FIG. 5 as being separate from content field 76, it will be appreciated that this is merely intended to be exemplary. In some implementations, control field 78 may overlap, at least in part, with content field 76. In some implementations, control field 78 and content field 76 may be the same field. Control field 78 may include one or more of a text entry box, selectable icons, a menu, a directional pad, and/or other control interface elements. By entering and/or selecting control inputs, the user may participate in the game presented through game interface 74.

Time field 80 may be configured to convey a measure of time related to the game. The measure of time may include one or more of an amount of time left in a turn or attempt, an amount of time that has expired in a turn or attempt, and/or other measures of time.

Score field 82 may present to the user a measure of success in the game. The measure of success may include one or more of a turn score, a game score, a prize earned, a number of successful attempts, and/or other measures of success.

Returning to FIG. 1, reward module 28 may be configured reward users based on the performance of the users in the games. For example, responsive to a user achieving a threshold level of success in a game, reward module 28 may provide a reward to the user. The threshold level may include one or more of a turn score, a game score, a cumulative game score, a maximum amount of time, a minimum amount of time, and/or other thresholds. The reward may include, for example, a virtual good, a virtual currency, and/or other rewards.

Reward module 28 may be configured to maintain leaderboards for the game. A given leaderboard may indicate relative success of individual users in a group of users on one or more games associated with the leaderboard. For example, the given leaderboard may indicate relative success for an individual game, the games for an individual website, and/or other sets of games. The given leaderboard may be available on the website of the associated game(s), at a website associated with game server 12 (separate from any website hosted by web server 16), and/or at other locations.

In some implementations, game server 12, client computing platforms 14, and/or web server 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, 16, and/or client computing platforms 14 may be connected and/or interface via some other configuration and/or mechanism.

A given client computing platform 14 may include one or more processors, and electronic display, a control interface, and/or other components. The one or more processors may be configured to execute computer program modules. The computer program modules may be configured to enable a user associated with the given client computing platform 14 to interface with system 10 and/or web server 16, and/or provide other functionality attributed herein to client computing platforms 14. For example, the computer program modules may include a view module configured to receive view information from server 12 (e.g., generated by game module 26), and to present a view of the virtual game environment (e.g., as described above) based on the received view information. This may facilitate participation by the user of the given client computing platform 14 in the game taking place in the virtual game environment. By way of non-limiting example, the given client computing platform 14 may include one or more of a desktop computer, a laptop computer, a handheld computer, a tablet computing platform, a NetBook, a Smartphone, a gaming console, and/or other computing platforms.

Game server 12 may include electronic storage 90, one or more processors 92, and/or other components. Game server 12 may include communication lines, or ports to enable the exchange of information with a network and/or other computing platforms. Illustration of game server 12 in FIG. 1 is not intended to be limiting. Game server 12 may include a plurality of hardware, software, and/or firmware components operating together to provide the functionality attributed herein to game server 12. For example, game server 12 may be implemented "in the cloud" by a plurality of computing platforms operating together as game server 12.

Electronic storage 90 may comprise electronic storage media that electronically stores information. The electronic storage media of electronic storage 90 may include one or both of system storage that is provided integrally (i.e., substantially non-removable) with game server 12 and/or removable storage that is removably connectable to game server 12 via, for example, a port (e.g., a USB port, a firewire port, etc.) or a drive (e.g., a disk drive, etc.). Electronic storage 90 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 90 may include one or more virtual storage resources (e.g., cloud storage, a virtual private network, and/or other virtual storage resources). Electronic storage 90 may store software algorithms, information determined by processor 92, information received from game server 12, information received from client computing platforms 14, and/or other information that enables game server 12 to function as described herein.

Processor(s) 92 is configured to provide information processing capabilities in game server 12. As such, processor 92 may include one or more of a digital processor, an analog processor, a digital circuit designed to process information, an analog circuit designed to process information, a state machine, and/or other mechanisms for electronically processing information. Although processor 92 is shown in FIG. 1 as a single entity, this is for illustrative purposes only. In some implementations, processor 92 may include a plurality of processing units. These processing units may be physically located within the same device, or processor 92 may represent processing functionality of a plurality of devices operating in coordination. The processor 92 may be configured to execute modules 18, 20, 22, 24, 26, and/or 28. Processor 92 may be configured to execute modules 18, 20, 22, 24, 26, and/or 28 by software; hardware; firmware; some combination of software, hardware, and/or firmware; and/or other mechanisms for configuring processing capabilities on processor 92.

It should be appreciated that although modules 18, 20, 22, 24, 26, and/or 28 are illustrated in FIG. 1 as being co-located within a single processing unit, in implementations in which processor 92 includes multiple processing units, one or more of modules 18, 20, 22, 24, 26, and/or 28 may be located remotely from the other modules. As a non-limiting example, some or all of the functionality attributed to modules 18, 20, 22, 24, 26, and/or 28 may be provided "in the cloud" by a plurality of processors connected through a network. The description of the functionality provided by the different modules 18, 20, 22, 24, 26, and/or 28 herein is for illustrative purposes, and is not intended to be limiting, as any of modules 18, 20, 22, 24, 26, and/or 28 may provide more or less functionality than is described. For example, one or more of modules 18, 20, 22, 24, 26, and/or 28 may be eliminated, and some or all of its functionality may be provided by other ones of modules 18, 20, 22, 24, 26, and/or 28. As another example, processor 92 may be configured to execute one or more additional modules that may perform some or all of the functionality attributed below to one of modules 18, 20, 22, 24, 26, and/or 28.

Figure 6:
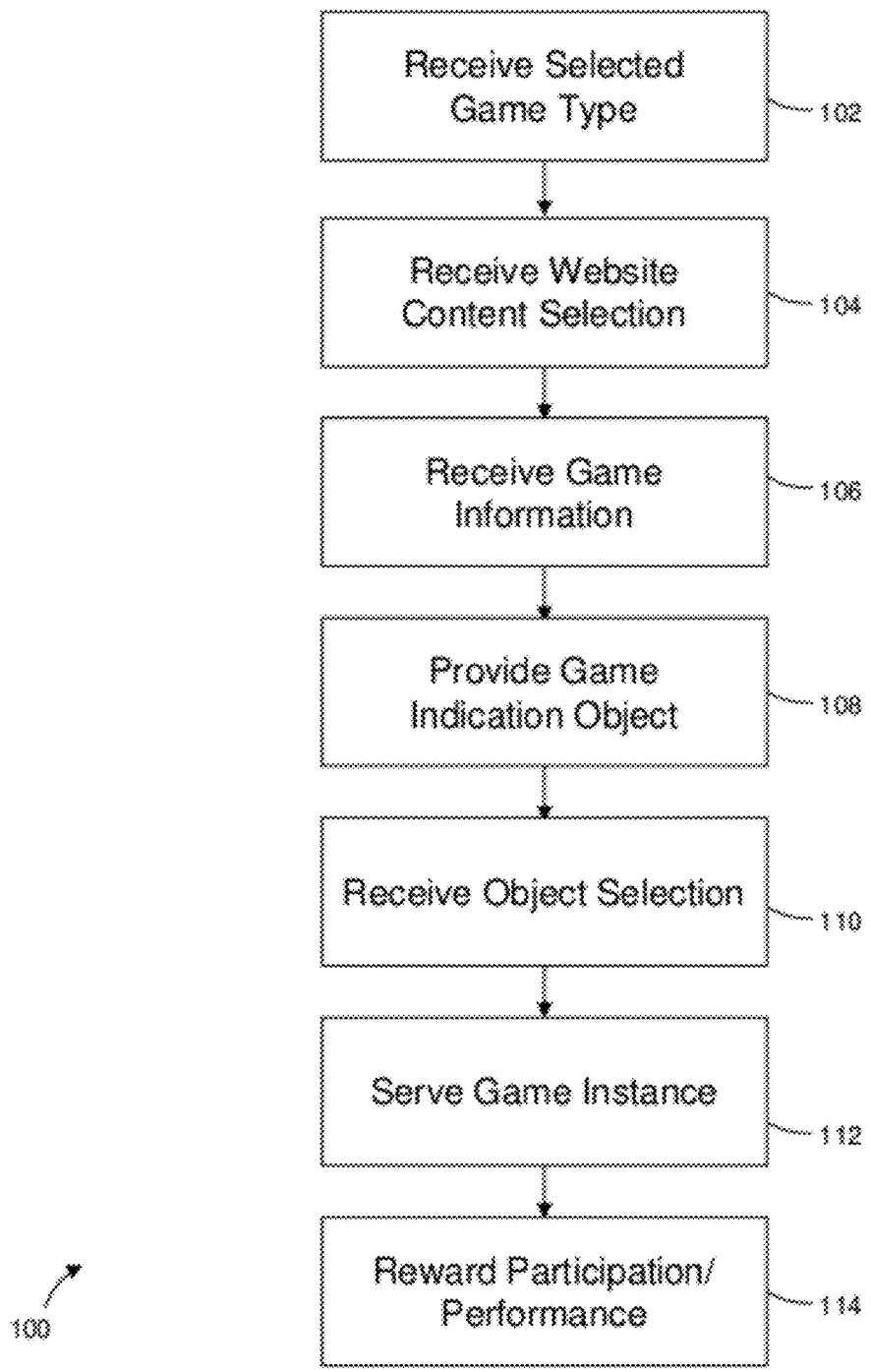
FIG. 6 illustrates a method of hosting a game embedded in a website

FIG. 6 illustrates a method 100 of hosting a game embedded in a website. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 6 and described below is not intended to be limiting.

In some embodiments, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

At an operation 102, a selection of a game template may be received from a creating user creating a game to be embedded in a webpage of a website. In some implementations, operation 102 may be performed by a game selection module similar to or the same as game selection module 18 (shown in FIG. 1 and described herein).

At an operation 104, selection of content from the website may be received. The content may include content to be used in the game being created. In some implementations, operation 104 may be performed by a content selection module similar to or the same as content selection module 20 (shown in FIG. 1 and described herein).

At an operation 106, information defining one or more aspects of the game may be received from the creating user. In some implementations, operation 106 may be performed by a game information module similar to or the same as game information module 22 (shown in FIG. 1 and described herein).

At an operation 108, a game indication object may be provided. The game indication provided at operation 108 may be embedded in a webpage of the website. The game indication object may indicate to users viewing the webpage that the game is available, the game that is associated with the game indication object, times the game has been played, top scoring players of the game, and other game related information. The game indication object may be selectable by users to initiate game play. In some implementations, operation 108 may be performed by a game indicator module similar to or the same as game indicator module 24 (shown in FIG. 1 and described herein).

At an operation 110, a selection of the game indication object by a user of the website may be received. In some implementations, operation 110 may be performed by a game module similar to or the same as game module 26 (shown in FIG. 1 and described herein).

At an operation 112, responsive to the received selection, an instance of the game may be served to the requesting user. This may include generating view information for transmission to a client computing device associated with the user. The view information may define a view of the instance of the game for presentation on the client computing device. The game includes content from the website selected at operation 104. In some implementations, operation 112 may be performed by a game module similar to or the same as game module 26 (shown in FIG. 1 and described herein).

At an operation 114, participation and/or performance in the game by the user may be rewarded. In some implementations, operation 114 may be performed by a reward module similar to or the same as reward module 28 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to host a game embedded in a website, the game being configured based on input from a first user associated with the website, the system comprising:

one or more game servers that are separate and discrete from the one or more web servers that host the website, the one or more game servers comprising one or more processors configured to execute computer program modules, the computer program modules comprising:

a content selection module configured to receive selections made by the first user of content from the website;

a game information module configured to receive information from the first user that defines one or more aspects of the game;

a game indicator module configured to provide a game indication object that is embedded in a webpage of the website, wherein the game indication object indicates to users viewing the webpage that the game is available, the game indication object being selectable by users of the webpage to initiate game play; and a game module configured receive selections of the game indication object by users through the webpage, and to serve the game to the users responsive to such selections, wherein the game module is configured such that responsive to selection of the game indication object by a second user viewing the webpage, the game module serves an instance of the game to the second user by generating view information for transmission to a client computing device associated with the second user that defines a view of the instance of the game for presentation on the client computing device, and wherein the game includes the content from the website selected by the first user.

2. The system of claim 1, wherein the computer program modules further comprise a game selection module configured to receive a selection by the first user of a game template for the game, wherein the game template specifies a game mechanic for the game.

3. The system of claim 2, wherein the game selection module is configured to present potential game templates to the first user for selection, and wherein the potential game templates are categorized by the content that they could turn into games.

4. The system of claim 1, wherein the game indicator module is configured such that the indicator object comprises one or more of an image, an applet, or a hyperlink.

5. The system of claim 1, wherein the game indicator object includes a network address associated with the one or more game servers, and wherein the game indicator object is configured such that responsive to selection of the game indicator object by the user, a game request is transmitted to the one or more game servers at the network address.

6. The system of claim 1, wherein the game indicator is configured such that responsive to user selection, the game indicator transmits back to the one or more game servers the webpage's URL and metadata from where the user selection was made.

7. The system of claim 1, wherein the game information module is configured to receive game information from the first user that includes questions about the content to be posed to users through instances of the game.

8. The system of claim 1, wherein the game information module is configured to receive game information from the first user that includes a performance threshold for the game by which user performance in the game will be measured.

9. The system of claim 1, wherein the computer program modules further comprise a reward module configured to reward the second user based on the performance of the second user in the game.

10. The system of claim 8, wherein the reward module is configured such that responsive to the second user achieving a threshold level of success in the game, the reward module provides the second user with a virtual good or currency.

11. The system of claim 8, wherein the reward module is configured to maintain a leaderboard that indicates relative success of a group of users in the game.

12. A computer-implemented method of hosting a game embedded in a website, the game being configured based on input from a first user associated with the website, the method being implemented in one or more game servers configured to execute computer program modules, the one or more game servers being separate and discrete from one or more web servers that host the website, the method comprising:
   receiving selections made by the first user of content from the website;
   receiving information from the first user that defines one or more aspects of the game;
   providing a game indication object that is embedded in a webpage of the website, wherein the game indication object indicates to users viewing the webpage that the game is available, the game indication object being selectable by users of the webpage to initiate game play; and
   receiving a selection of the game indication object by a second user through the webpage; and
   responsive to selection of the game indication object by the second user viewing the webpage, serving an instance of the game to the second user by generating view information for transmission to a client computing device associated with the second user that defines a view of the instance of the game for presentation on the client computing device, wherein the game includes the content from the website selected by the first user.

13. The method of claim 12, further comprising receiving a selection by the first user of a game template for the game, wherein the game template specifies a game mechanic for the game.

14. The method of claim 13, further comprising presenting potential game templates to the first user for selection, wherein the potential game templates include one or more of a trivia game template, a word game template, an image analysis game template, or an image puzzle game template.

15. The method of claim 12, wherein the indicator object comprises one or more of an image, an applet, or a hyperlink.

16. The method of claim 12, wherein the game indicator object includes a network address associated with the one or more game servers, and wherein the game indicator object is configured such that responsive to selection of the game indicator object by the user, a game request is transmitted to the one or more game servers at the network address.

17. The method of claim 12, wherein the game information received from the first user includes questions about the content to be posed to users through instances of the game.

18. The method of claim 12, wherein the game information includes a performance threshold for the game by which user performance in the game will be measured.

19. The method of claim 12, further comprising rewarding the second user based on the performance of the second user in the game.

20. The method of claim 19, wherein rewarding the second user comprises, responsive to the second user achieving a threshold level of success in the game, the providing the second user with a virtual good or currency.

21. The method of claim 12, further comprising maintaining a leaderboard that indicates relative success of a group of users in the game or a group of games based on the same game template.

* * * * *